United States Patent
Herman

(10) Patent No.: US 6,674,898 B2
(45) Date of Patent: Jan. 6, 2004

(54) APPARATUS AND METHOD FOR CORRECTING SIGNAL AND COLOR DEGRADATION IN A VIDEO USING KNOWN ICONS FROM VIDEO IMAGES

(75) Inventor: Stephen Herman, Monsey, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 564 days.

(21) Appl. No.: 09/732,586

(22) Filed: Dec. 8, 2000

(65) Prior Publication Data

US 2002/0080372 A1 Jun. 27, 2002

(51) Int. Cl.[7] .................................................. G06K 9/00
(52) U.S. Cl. ...................................... 382/167; 358/518
(58) Field of Search ................................ 382/162–167; 358/518–540; 345/598–610

(56) References Cited

U.S. PATENT DOCUMENTS

| | | | | |
|---|---|---|---|---|
| 5,255,076 A | | 10/1993 | Koyano ........................ | 358/27 |
| 5,333,070 A | | 7/1994 | Ichikawa ..................... | 857/262 |
| 5,381,185 A | | 1/1995 | Ohki et al. .................. | 348/652 |
| 5,481,380 A | * | 1/1996 | Bestmann et al. ........... | 358/518 |
| 5,974,198 A | * | 10/1999 | Hamburg et al. ............ | 382/284 |
| 6,009,192 A | * | 12/1999 | Klassen et al. .............. | 382/167 |
| 6,163,321 A | * | 12/2000 | Kiyokawa et al. ........... | 345/589 |

FOREIGN PATENT DOCUMENTS

| | | | |
|---|---|---|---|
| EP | 0620692 A1 | 10/1994 | ............ H04N/9/64 |
| EP | 0812116 A3 | 12/1997 | ............ H04N/9/64 |
| EP | 0812116 A2 | 12/1997 | ............ H04N/9/64 |

* cited by examiner

Primary Examiner—Jingge Wu
(74) Attorney, Agent, or Firm—Edward W. Goodman

(57) ABSTRACT

There is disclosed an apparatus for correcting the color of objects appearing in a video image. The apparatus comprises: 1) a frame buffer for receiving and storing a first video frame from an incoming baseband video signal; 2) a memory for storing known pixel data corresponding to a plurality of known icons, the known pixel data comprising true color data values associated with the plurality of known icons; and 3) a color correction controller for comparing captured pixel data from the stored first video frame with the known pixel data stored in the memory and detecting a first actual image of a first known icon appearing in the stored first video frame. The color correction controller also compares a first true color data value associated with the first known icon and a first actual color data value associated with a first actual color in the first actual image of the first known icon. In response to the comparison, the color correction controller determine a first color correction factor associated with the first actual color data value.

20 Claims, 4 Drawing Sheets

APPARATUS AND METHOD FOR CORRECTING SIGNAL AND COLOR DEGRADATION IN A VIDEO USING KNOWN ICONS FROM VIDEO IMAGES

TECHNICAL FIELD OF THE INVENTION

The present invention is directed, in general, to video processing systems and, more specifically, to an apparatus and method for correcting color degradation and other signal degradation in a video image.

BACKGROUND OF THE INVENTION

The colors in a video image displayed on a television screen or the monitor display of a personal computer (PC) frequently exhibit differences from scene shot to scene shot due to a variety of reasons. In order to maintain constant color appearance from scene shot to scene shot, all cameras and even the television receivers must be set to the same colorimetry standards. Often, this is not done with sufficient care and there are noticeable variations in color appearance. The result is that the color appearance of programs, as viewed on a television receiver, varies significantly from receiver to receiver and from time to time even on the same receiver.

There is therefore a need in the art for improved systems and methods for maintaining constant color from scene shot to scene shot in a video image. In particular, there is a need for color correction apparatuses for use in television receivers, personal computers, video cassette recorders, and the like that correct color differences from scene to scene in a video image. More particularly, there is a need for color correction apparatuses that correct the colors of objects in a video image to match the true colors of those objects.

SUMMARY OF THE INVENTION

To address the above-discussed deficiencies of the prior art, it is a primary object of the present invention to provide an apparatus for correcting the color of objects appearing in a video image. In an advantageous embodiment of the present invention, the apparatus comprises: 1) a frame buffer capable of receiving and storing a first video frame from an incoming baseband video signal; 2) a memory capable of storing known pixel data corresponding to a plurality of known icons, the known pixel data comprising true color data values associated with the plurality of known icons; and 3) a color correction controller capable of comparing captured pixel data from the stored first video frame with the known pixel data stored in the memory and detecting a first actual image of a first known icon appearing in the stored first video frame, wherein the color correction controller is further capable of comparing a first true color data value associated with the first known icon and a first actual color data value associated with a first actual color in the first actual image of the first known icon and, in response to the comparison, determining a first color correction factor associated with the first actual color data value.

According to one embodiment of the present invention, the color correction controller uses the first color correction factor to correct the first actual color data value in the first actual image in the stored first video frame.

According to another embodiment of the present invention, the color correction controller identifies in the stored first video frame a first unknown object having associated therewith a second actual color data value substantially equal to the first actual color data value and wherein the color correction controller uses the first color correction factor to correct the second actual color data value of the first unknown object in the stored first video frame.

According to still another embodiment of the present invention, the color correction controller is capable of determining from the first color correction factor a second color correction factor associated with a third actual color data value.

According to yet another embodiment of the present invention, the color correction controller identifies in the stored first video frame a second unknown object having associated therewith a fourth actual color data value substantially equal to the third actual color data value and wherein the color correction controller uses the second color correction factor to correct the fourth actual color data value of the second unknown object in the stored first video frame.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise" and derivatives thereof mean inclusion without limitation; the term "or" is inclusive, meaning and/or; the phrases "associated with" and "associated therewith" and derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. In the sections that follows, the present invention will be described in two exemplary embodiments, namely, a personal computer (PC) and a digital television set. However, this is by way of example only and should not be construed so as to limit the scope of the invention in any way. Those skilled in the art will understand that the principles of the present invention may be implemented in any suitably arranged video processing system, including a video cassette recorder (VCR), a disk-based video playback system, such as a TIVO™ system or a REPLAYTV™ system, or the like.

Figure 1:
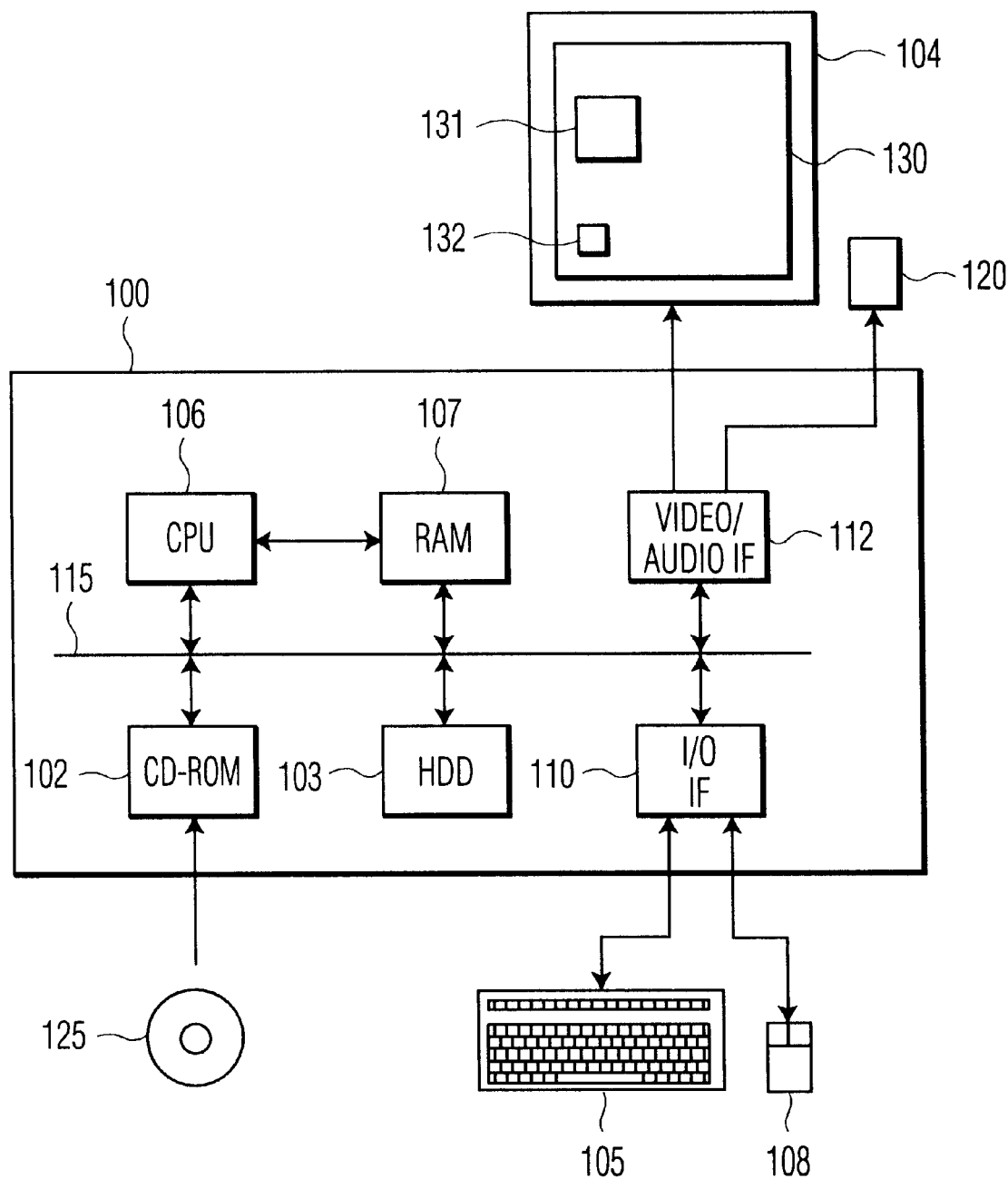
FIG. 1 is a block diagram of an exemplary processing system capable of correcting colors in a video image according to one embodiment of the present invention.

FIG. 1 is a block diagram of exemplary personal computer (PC) 100, which corrects colors in a video image according to one embodiment of the present invention. Personal computer 100 comprises compact disk (CD) read-only-memory (ROM) drive 102, hard disk drive (HDD) 103, display monitor 104, keyboard 105, central processing unit (CPU) 106, random access memory (RAM) 107, pointing device 108 (e.g., a mouse), input/output (I/O) interface (IF) circuit 110, video/audio interface (IF) circuit 112, and speaker 120. CD-ROM disk drive 102 is capable of receiving and reading removable CD-ROM disk 125.

Display monitor 104 serves as the computer monitor for personal computer 100. Display monitor 104 may be either a cathode ray tube (CRT) screen, a liquid crystal display (LCD) screen, a flat panel display screen, a plasma display screen, a projection display screen, or any other device suitable for displaying images. Display monitor 104 comprises screen 130, which displays a video image that may contain known, recognizable icons, such as icon 131 and icon 132, whose colors are well known and constant.

Hard disk drive 105 provides fast access for storage and retrieval of the operating system program, application programs, and data. Keyboard 105 and pointing device 108 are coupled to personal computer 100 through I/O IF circuit 110. Display monitor 104 and speaker 120 are coupled to personal computer 100 through video/audio IF circuit 112. The internal components of personal computer 100, including CD-ROM disk drive 102, hard disk drive 103, CPU 106, RAM 107, I/O IF circuit 110 and video/audio IF circuit 112, are coupled to each other and communicate with each other through communication bus 115.

As will be described below in greater detail, CPU 106 is capable of executing a color correction application that corrects the colors of objects appearing on screen 130. The color correction application accomplishes this by detecting (or recognizing) well-known objects in captured video frames and comparing the actual colors of the well-known objects with the known, correct colors of the objects. For example, icon 131 may be a COCA-COLA™ can that appears on screen 130 and icon 132 may be the "Peacock" logo that appears on NBC™ television channels. The color correction application operates in conjunction with any other application executed in PC 100 that produces a video signal, such as a streaming video application, an MPEG or AVI player, a video card that receives and demodulates an incoming RF television signal to produce a baseband video signal, and the like. In an advantageous embodiment of the present invention, the color correction application program executed by CPU 106 may be stored on CD-ROM 125 (or on a 3.5 inch removable diskette).

Additionally, many methods have been published for detecting scene changes and for detecting human faces in real-time TV image sequences. Detecting human faces has been the subject of a number of disclosures since the face is generally a common object in most TV programs. In an advantageous embodiment of the present invention, CPU 106 also executes a color correction application that corrects the colors of detected faces appearing on screen 130. It is possible to do this because the true colors of human faces generally fall within a few narrow color ranges. By comparing the color of a detected face with the known true colors, color errors in an incoming image can be detected and color correction factors can be calculated.

For the sake of simplicity in explaining the present invention and for defining the scope of the claims of the present invention, the term "known icons" as used herein shall include both well-known objects such as network logos and product trademarks and known human face colors.

Figure 2:
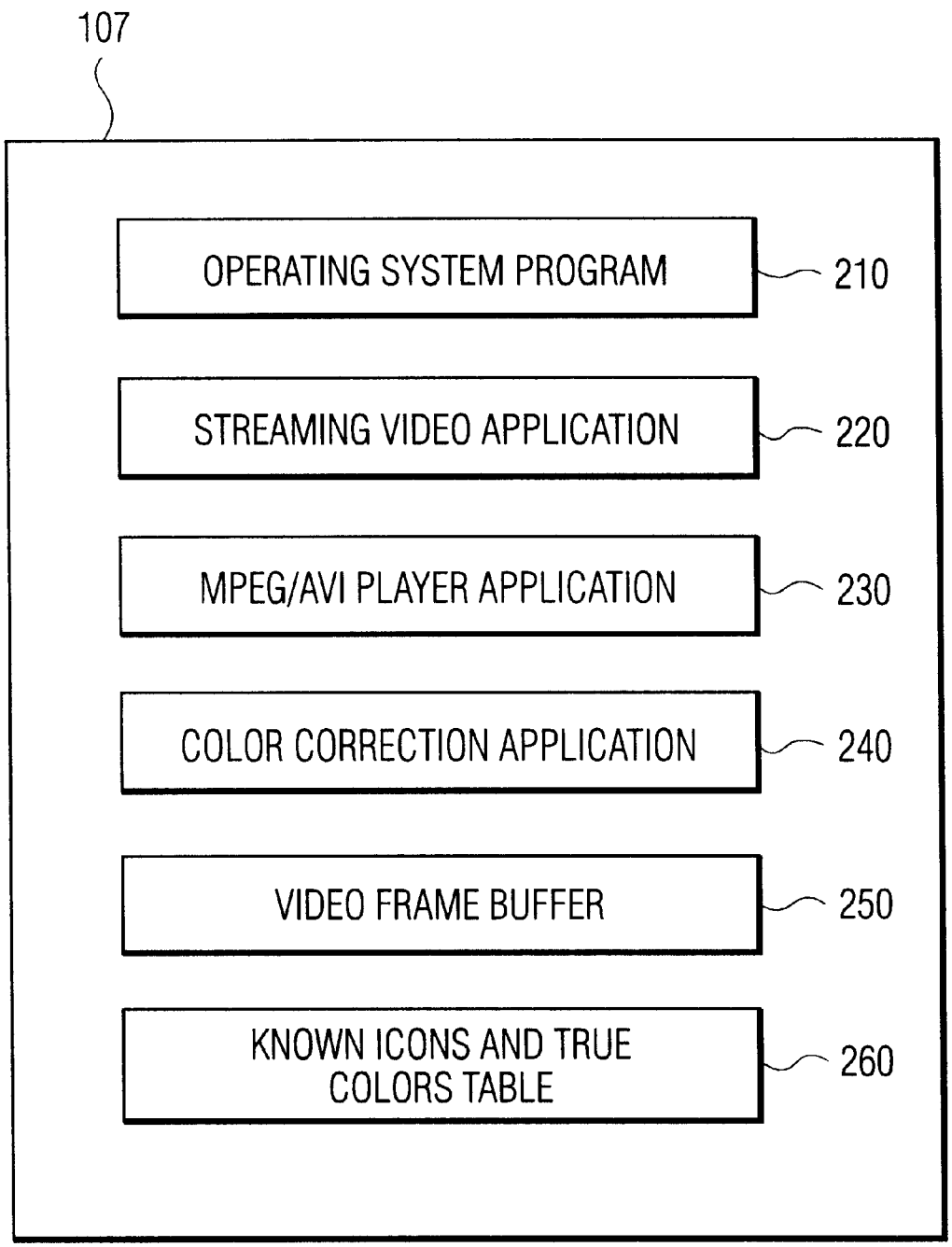
FIG. 2 illustrates the contents of a memory in the exemplary processing system according to one embodiment of the present invention.

FIG. 2 illustrates selected portions of memory in RAM 107 in exemplary personal computer 100 according to one embodiment of the present invention. Personal computer 100 is a known computer and is described in this embodiment but, as is well known in the art, there are many computers, such as Apple's Macintosh™ that utilize different operating systems and different configurations of hardware. All such embodiments utilize similar systems and hardware to produce a display. In this preferred embodiment, RAM 107 stores operating system program 210, streaming video application program 220, MPEG/AVI player application program 230, color correction application program 240, video frame buffer 250, and known icons and true colors table 260.

Known icons are selected for their distinctive shape and color. Examples of known icons include: icons for broadcast networks such as NBC™, CBS™ and ABC™; corporate logos such as Coca Cola™ and IBM™ and TV program logos such as NBA™ basketball or NFL™ football. Each icon is consistent in color, a particular shade of red being associated with Coca Cola™ and a specific shade of blue being associated with IBM™. Another color example, the NBC™ peacock logo icon is a very distinctive shape and contains more than one color. The shapes, in the form of a pixel map, and accurate color scheme are stored in known icons and true colors table 260.

Color correction application 240 retrieves frames from an incoming signal and searches the frame for a detectable icon or shape that is stored in known icon and true colors table. The detected shape is compared to the stored icons and if the icon is known, color correction application 240 makes any corrections to color in the incoming signal and sends it to a video display. Since the exact shape and spatial frequency content is known, the stored icons can be used as reference signals to correct for color errors, and provide correction for frequency domain degradations.

Figure 3:
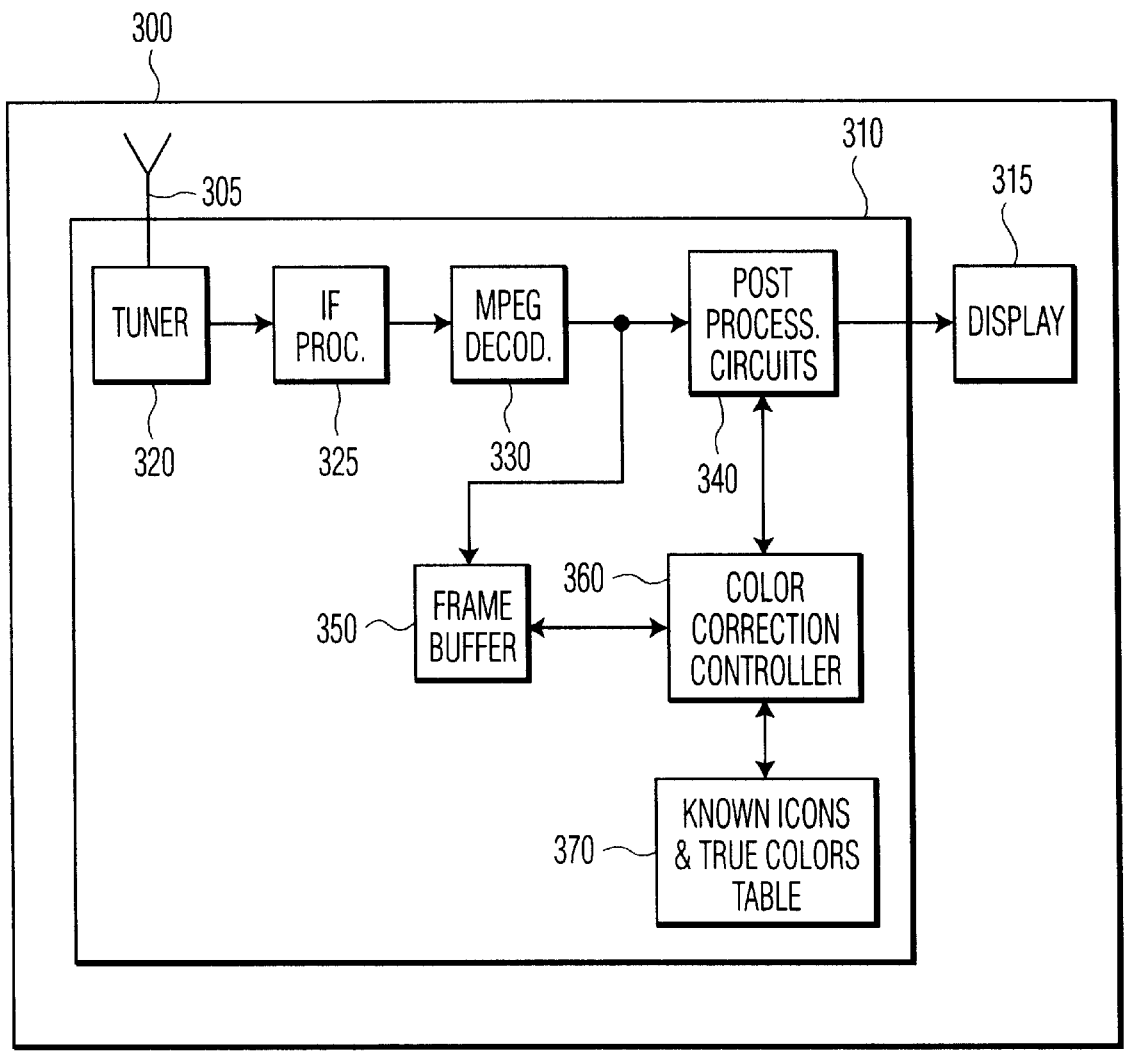
FIG. 3 is a block diagram of an exemplary television receiver containing a color correction apparatus according to one embodiment of the present invention.

FIG. 3 is a block diagram of exemplary television set 300, which contains a color correction apparatus according to one embodiment of the present invention. Television set 100 comprises antenna 305, television receiver 310, and display unit 315. Antenna 305 receives incoming radio frequency (RF) television signals that are processed by television receiver 310. Display unit 315 may be, for example, a cathode ray tube, a flat panel display, or any other type of equipment for displaying video images.

Television receiver 310 comprises tuner 320, intermediate frequency (IF) processor 325, "optional" MPEG decoder 330, and post-processing circuitry 340. MPEG decoder 330 is optional in the exemplary embodiment because television receiver 310 may be a conventional analog television receiver that does not contain an MPEG decoder. In such an embodiment, the output of IF processor 325 is used directly by post-processing circuitry 340. In an advantageous embodiment of the present invention, television receiver 310 further comprises frame buffer 350, color correction controller 360, and known icons and true colors table 370.

Tuner 320 down-converts the incoming RF signal to produce an intermediate frequency (IF) signal. The IF output of tuner 320 is further down-converted by IF processor 325 to produce a baseband signal that may be, for example a digital transport stream. MPEG decoder 330 may comprise a demultiplexer circuit that extracts from the transport stream at least one elementary stream, such as an MPEG-encoded data stream. MPEG decoder 330 then converts the encoded MPEG data stream and generates a standard analog baseband video signal capable of being displayed by display unit 315.

However, in order to further improve the quality of the video signal generated by MPEG decoder 330, the output of MPEG decoder 330 is transferred to post-processing circuitry 340 for additional processing. The improved video signal at the output of post-processing circuitry 340 is then transmitted to display unit 315. Post-processing circuitry 340 is capable of carrying out several different types of video signal processing. Exemplary video signal processing functions performed by post-processing circuitry 340 may include: noise reduction algorithms, scaling, scan-rate conversion, adaptive feature enhancement, MPEG de-blocking, and other adaptive object based algorithms.

Frame buffer 350 captures individual image frames from the output of MPEG decoder 330. The frames are temporarily stored in a selected portion of RAM memory. Color correction controller 360 scans the captured frames and compares the pixel data in captured frames with corresponding pixel data of known icons stored in table 370. Color correction controller 360 identifies known icons and compares the actual colors, as determined from the captured frames, with the stored, known true colors of the icons. Color correction controller 360 then determines correction factors for the actual colors in the displayed icons and (optionally) extrapolates the color correction factors of the known icon colors to determine color correction factors for other colors in the video image. Color correction factors or corrected frames are then sent to post processing circuits 340. The fully processed frames are then passed on to display 315.

As is well known in the art, video image signals may be transmitted in analog or digital form. The signals are transmitted by different methods including a broadcast antenna, television cable, and by digital recorded media such as CD-ROM or Digital Video Disk. The signals can be received by analog and digital television receivers, video cassette recorders, CD or DVD players and the like. The signals can then be processed by the present invention prior to sending the processed signal to a display.

Figure 4:
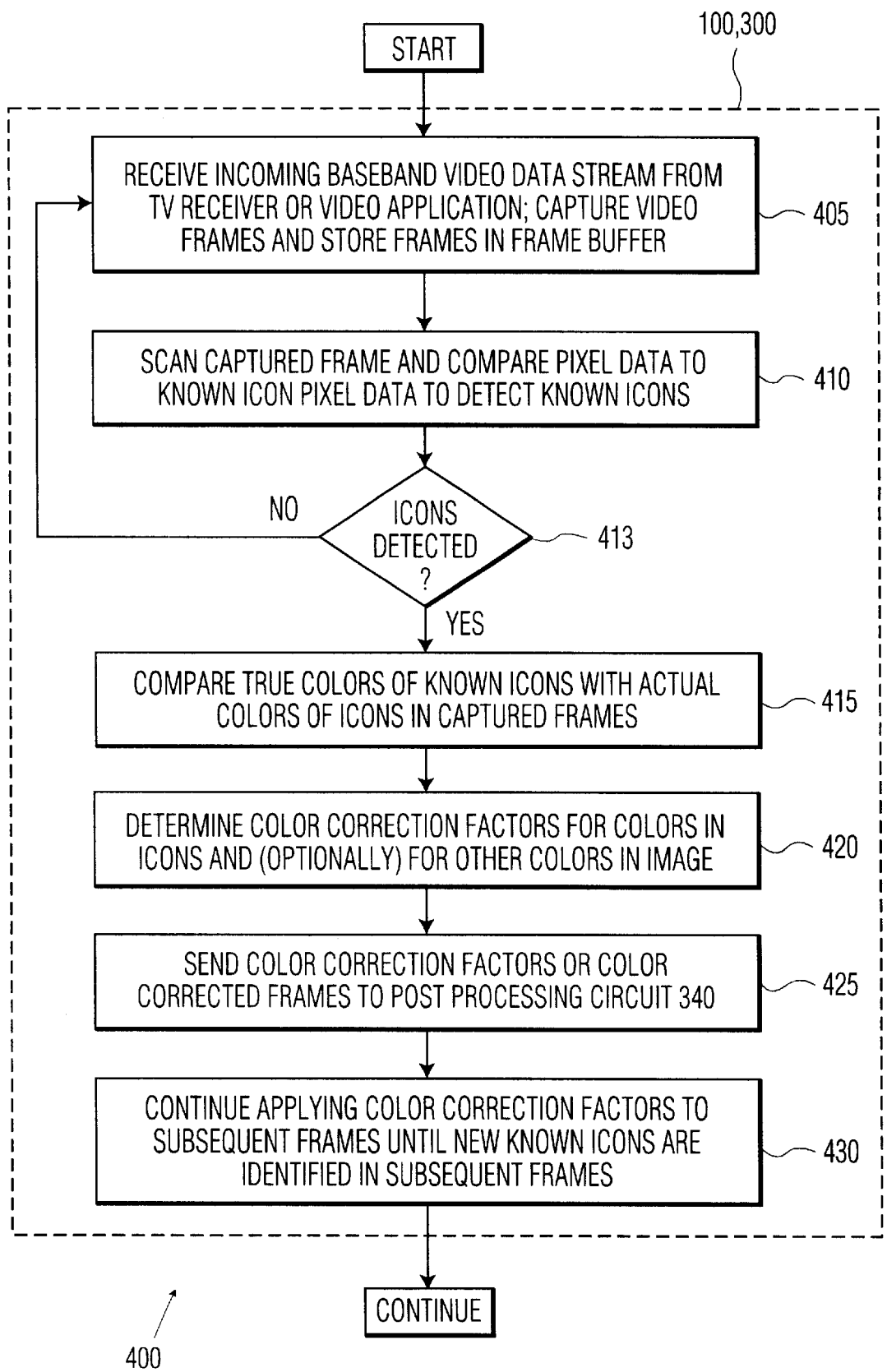
FIG. 4 is a flow chart illustrating a color correction operation according to the principles of the present invention.

FIG. 4 is a high-level flow chart illustrating a color correction operation according to the principles of the present invention. The process begins with step 405, which depicts a video stream being received by the MPEG decoder from a TV receiver or video application (refer to block diagram in FIG. 3). Individual video frames are captured from the output of the decoder and stored in a frame buffer. The process continues to step 410, which illustrates a color correction controller 360 scanning the stored video frames for known icons. The pixel data of detected shapes are compared to pixel data of known icons stored in a known icons and true colors table. The process proceeds to step 413, which depicts a determination of whether there is a detectable icon present in the frame. If not, the process returns to step 405 and continues. If there is a match, the process proceeds to step 415, which depicts color correction controller 360 comparing the true colors of known icons with the actual colors of the detected icons in the captured frames.

The process then passes to step 420, which illustrates color correction application 240 determining if any color correction factors are necessary for the detected icons in the frame. Optionally, using the detected icon colors as a baseline, color correction application 240 may determine the factors necessary for correcting other colors in the frame. The process next passes to step 425, which depicts color correction controller 360 sending color correction factors or color corrected frames to post processing circuit 340. The process proceeds to step 430, which illustrates color correction controller 360 applying color correction factors to subsequent frames until new, known icons are identified in subsequent frames. The process returns to step 405 and continues.

Although the present invention has been described in detail, those skilled in the art should understand that they can make various changes, substitutions and alterations herein without departing from the spirit and scope of the invention in its form.

What is claimed is:

1. An apparatus for correcting the color of objects appearing in a video image comprising:

a frame buffer capable of receiving and storing a first video frame from an incoming baseband video signal;

a memory capable of storing known pixel data corresponding to a plurality of known icons, said known pixel data comprising true color data values associated with said plurality of known icons; and a color correction controller capable of comparing captured pixel data from said stored first video frame with said known pixel data stored in said memory and detecting a first actual image of a first known icon appearing in said stored first video frame, wherein said color correction controller is further capable of comparing a first true color data value associated with said first known icon and a first actual color data value associated with a first actual color in said first actual image of said first known icon and, in response to said comparison, determining a first color correction factor associated with said first actual color data value.

2. The apparatus as set forth in claim 1 wherein said color correction controller uses said first color correction factor to correct said first actual color data value in said first actual image in said stored first video frame.

3. The apparatus as set forth in claim 2 wherein said color correction controller identifies in said stored first video frame a first unknown object having associated therewith a second actual color data value substantially equal to said first actual color data value and wherein said color correction controller uses said first color correction factor to correct said second actual color data value of said first unknown object in said stored first video frame.

4. The apparatus as set forth in claim 3 wherein said color correction controller is capable of determining from said first color correction factor a second color correction factor associated with a third actual color data value.

5. The apparatus as set forth in claim 4 wherein said color correction controller identifies in said stored first video frame a second unknown object having associated therewith a fourth actual color data value substantially equal to said third actual color data value and wherein said color correction controller uses said second color correction factor to correct said fourth actual color data value of said second unknown object in said stored first video frame.

6. A television set comprising:
transceiver circuitry capable of receiving an incoming radio frequency (RF) signal and generating therefrom an incoming baseband video signal;
a frame buffer capable of receiving and storing a first video frame from said incoming baseband video signal;
a memory capable of storing known pixel data corresponding to a plurality of known icons, said known pixel data comprising true color data values associated with said plurality of known icons;
a color correction controller capable of comparing captured pixel data from said stored first video frame with said known pixel data stored in said memory and detecting a first actual image of a first known icon appearing in said stored first video frame, wherein said color correction controller is further capable of comparing a first true color data value associated with said first known icon and a first actual color data value associated with a first actual color in said first actual image of said first known icon and, in response to said comparison, determining a first color correction factor associated with said first actual color data value; and
a display screen for displaying said first video frame.

7. The television set as set forth in claim 6 wherein said color correction controller uses said first color correction factor to correct said first actual color data value in said first actual image in said stored first video frame.

8. The television set as set forth in claim 7 wherein said color correction controller identifies in said stored first video frame a first unknown object having associated therewith a second actual color data value substantially equal to said first actual color data value and wherein said color correction controller uses said first color correction factor to correct said second actual color data value of said first unknown object in said stored first video frame.

9. The television set as set forth in claim 8 wherein said color correction controller is capable of determining from said first color correction factor a second color correction factor associated with a third actual color data value.

10. The television set as set forth in claim 9 wherein said color correction controller identifies in said stored first video frame a second unknown object having associated therewith a fourth actual color data value substantially equal to said third actual color data value and wherein said color correction controller uses said second color correction factor to correct said fourth actual color data value of said second unknown object in said stored first video frame.

11. A method for correcting the color of objects appearing in a video image comprising the steps of:
receiving and storing a first video frame from an incoming baseband video signal in a frame buffer;
storing in a memory known pixel data corresponding to a plurality of known icons, the known pixel data comprising true color data values associated with the plurality of known icons; and
comparing captured pixel data from the stored first video frame with the known pixel data stored in the memory;
detecting a first actual image of a first known icon appearing in the stored first video frame;
comparing a first true color data value associated with the first known icon and a first actual color data value associated with a first actual color in the first actual image of the first known icon; and
in response to the comparison, determining a first color correction factor associated with the first actual color data value.

12. The method as set forth in claim 11 further comprising the step of using the first color correction factor to correct the first actual color data value in the first actual image in the stored first video frame.

13. The method as set forth in claim 12 further comprising the steps of:
identifying in the stored first video frame a first unknown object having associated therewith a second actual color data value substantially equal to the first actual color data value; and
using the first color correction factor to correct the second actual color data value of the first unknown object in the stored first video frame.

14. The method as set forth in claim 13 further comprising the step of determining from the first color correction factor a second color correction factor associated with a third actual color data value.

15. The method as set forth in claim 14 further comprising the steps of:
identifying in the stored first video frame a second unknown object having associated therewith a fourth actual color data value substantially equal to the third actual color data value; and
using the second color correction factor to correct the fourth actual color data value of the second unknown object in the stored first video frame.

16. For use in a processing system having a display screen, computer-executable instructions stored on a computer-readable storage medium for correcting the color of objects appearing in a video image, the computer-executable instructions comprising the steps of:
receiving and storing a first video frame from an incoming baseband video signal in a frame buffer;
storing in a memory known pixel data corresponding to a plurality of known icons, the known pixel data comprising true color data values associated with the plurality of known icons; and
comparing captured pixel data from the stored first video frame with the known pixel data stored in the memory;
detecting a first actual image of a first known icon appearing in the stored first video frame;
comparing a first true color data value associated with the first known icon and a first actual color data value associated with a first actual color in the first actual image of the first known icon; and
in response to the comparison, determining a first color correction factor associated with the first actual color data value.

17. The computer-executable instructions stored on a computer-readable storage medium as set forth in claim 16 further comprising the step of using the first color correction factor to correct the first actual color data value in the first actual image in the stored first video frame.

18. The computer-executable instructions stored on a computer-readable storage medium as set forth in claim 17 further comprising the steps of:

identifying in the stored first video frame a first unknown object having associated therewith a second actual color data value substantially equal to the first actual color data value; and using the first color correction factor to correct the second actual color data value of the first unknown object in the stored first video frame.

19. The computer-executable instructions stored on a computer-readable storage medium as set forth in claim 18 further comprising the step of determining from the first color correction factor a second color correction factor associated with a third actual color data value.

20. The computer-executable instructions stored on a computer-readable storage medium as set forth in claim 18 further comprising the steps of:

identifying in the stored first video frame a second unknown object having associated therewith a fourth actual color data value substantially equal to the third actual color data value; and using the second color correction factor to correct the fourth actual color data value of the second unknown object in the stored first video frame.

\* \* \* \* \*